US012583410B2

(12) United States Patent
Ogino

(10) Patent No.: US 12,583,410 B2
(45) Date of Patent: Mar. 24, 2026

(54) AIRBAG DEVICE

(71) Applicant: Autoliv Development AB, Vargarda (SE)

(72) Inventor: Tetsuya Ogino, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/722,986

(22) PCT Filed: Nov. 4, 2022

(86) PCT No.: PCT/JP2022/041207
§ 371 (c)(1),
(2) Date: Dec. 26, 2024

(87) PCT Pub. No.: WO2023/127305
PCT Pub. Date: Jul. 6, 2023

(65) Prior Publication Data
US 2025/0153675 A1 May 15, 2025

(30) Foreign Application Priority Data

Dec. 27, 2021 (JP) ................................. 2021-212175
Apr. 22, 2022 (JP) ................................. 2022-071032

(51) Int. Cl.
*B60R 21/213* (2011.01)
*B60R 21/232* (2011.01)
(Continued)

(52) U.S. Cl.
CPC .......... *B60R 21/213* (2013.01); *B60R 21/232* (2013.01); *B60R 21/233* (2013.01); *B60R 2021/2612* (2013.01)

(58) Field of Classification Search
CPC ... B60R 21/213; B60R 21/232; B60R 21/233; B60R 2021/23308; B60R 2021/23316; B60R 2021/2612
See application file for complete search history.

(56) References Cited

U.S. PATENT DOCUMENTS 6,102,435 A * 8/2000 Wallner .............. B60R 13/0212
280/730.2
6,338,498 B1 * 1/2002 Niederman ........... B60R 21/232
280/730.2

(Continued)

FOREIGN PATENT DOCUMENTS

JP 2009-166547 A 7/2009
JP 2014-201177 A 10/2014
(Continued)

*Primary Examiner* — Laura Freedman
(74) *Attorney, Agent, or Firm* — Harness, Dickey & Pierce, P.L.C.

(57) ABSTRACT

An airbag device comprising: a cushion that is rolled and stowed at an upper part of a side surface and expands and deploys along the side surface, an inflator that is inserted in the cushion and provides gas to the cushion, and a tab for suspending the cushion from the upper part of the side surface, wherein the cushion includes: a duct provided with a tab extending in the front-to-back direction of the vehicle at the upper part of the side surface and that expands and deploys due to inflow of gas, a main chamber positioned below the duct, and a sub chamber provided at the upper part of the side surface, the upper end of the sub chamber is positioned above the upper edge of the side window, and the lower end of the sub chamber is positioned below the upper end of the duct.

15 Claims, 9 Drawing Sheets

(51) Int. Cl.
    *B60R 21/233*        (2006.01)
    *B60R 21/261*        (2011.01)

(56)                References Cited

U.S. PATENT DOCUMENTS

| | | | |
|---|---|---|---|
| 6,830,262 B2 * | 12/2004 | Sonnenberg | B60R 21/232 |
| | | | 280/730.2 |
| 7,264,267 B2 * | 9/2007 | Kino | B60R 21/232 |
| | | | 280/730.2 |
| 7,390,016 B2 * | 6/2008 | Noguchi | B60R 21/232 |
| | | | 280/730.2 |
| 7,731,224 B2 * | 6/2010 | Enriquez | B60R 21/201 |
| | | | 280/730.2 |
| 7,967,332 B2 * | 6/2011 | Karlsson | B60R 21/232 |
| | | | 280/730.2 |
| 8,020,888 B2 * | 9/2011 | Cheal | B60R 21/233 |
| | | | 280/730.2 |
| 8,414,014 B2 * | 4/2013 | Nogami | B60R 21/2338 |
| | | | 280/730.2 |
| 9,126,558 B2 * | 9/2015 | Kawamura | B60R 21/213 |
| 9,963,102 B1 * | 5/2018 | Ballam | B60R 21/237 |
| 10,214,173 B2 * | 2/2019 | Asada | B60R 21/213 |
| 10,493,943 B2 * | 12/2019 | Sugimori | B60R 21/2338 |
| 11,254,279 B2 * | 2/2022 | Lee | B60R 21/213 |
| 11,597,344 B2 * | 3/2023 | Lee | B60R 21/233 |
| 11,945,394 B2 * | 4/2024 | Moon | B60R 21/2346 |
| 2011/0187086 A1 | 8/2011 | Fulmer et al. | |

FOREIGN PATENT DOCUMENTS

| | | | |
|---|---|---|---|
| JP | 2015-067216 A | 4/2015 | |
| WO | 2009/157300 A1 | 12/2009 | |
| WO | 2011/001986 A1 | 1/2011 | |

* cited by examiner

Up

Left ←→ Right

Down

A-A

AIRBAG DEVICE

TECHNICAL FIELD

The present invention relates to an airbag device provided with a curtain airbag that expands and deploys along a side surface inside a vehicle for the purpose of protecting the occupant during a side collision or rollover of the vehicle.

BACKGROUND ART

Curtain airbags must deploy along a side surface of a vehicle to cover all regions where the occupant's head and upper body may be impacted, even if the vehicle transitions from a side collision to a rollover.

Therefore, curtain airbags are mounted to the chassis such as a roof side rail positioned at an upper part of a side surface in a vehicle cabin and stowed in a rolled or folded state in a stow space between the chassis and garnish such as a roof headlining position above the door.

Curtain airbags typically have a plurality of tabs provided at prescribed intervals on an upper end part thereof. Curtain airbags can be suspended from the upper part of the side surface inside the vehicle cabin by attaching each tab to the chassis via a bracket.

A curtain airbag disclosed in Patent Document 1 includes a front chamber, a first gas supply opening, a sub chamber, and a second gas supply opening. The front chamber expands and deploys along the side window of the vehicle front seat. The first gas supply opening is arranged above the front chamber and supplies gas to the front chamber. The sub chamber is a chamber arranged above the front chamber that is smaller than the front chamber.

The second gas supply opening is arranged behind the sub chamber, is connected to the first gas supply opening, and is narrower than the first gas supply opening. The sub chamber is stowed in a folded state at a portion of the second gas supply opening on the vehicle interior surface of the front chamber.

In Patent Document 1, after first causing the front chamber to expand and deploy during expansion and deployment of the curtain airbag, the sub chamber can be expanded and deployed enabling expansion and deployment of the sub chamber while suppressing interference between the A pillar garnish and the sub chamber and covering the A pillar.

RELATED ART DOCUMENTS

Patent Documents

Patent Document 1: Japanese Unexamined Patent Application 2018-114828

SUMMARY OF THE INVENTION

Problem to be Solved by the Invention

In recent years, in conjunction with introduction of the New Car Assessment Program (NCAP), the region (protective area) to be covered during expansion and deployment of the curtain airbag (cushion) was specified. Here the cushion is suspended from the upper part of the side surface inside the vehicle cabin by tabs during expansion and deployment. The length of the tab needs to be set with consideration for the shape of the cushion in a stowed state and the deployment behavior of the cushion.

The tab being too short will affect the deployment behavior of the cushion such as causing a change in the deployment direction of the cushion. Therefore, the length of the tab is set with consideration for ensuring suitable deployment behavior of the cushion and for the shape of the cushion in the stowed state.

Thus, with this manner of airbag device, at the position the tab is attached, a certain length of tab needs to be ensured, and this led to cases where the cushion was not sufficiently lifted by the tabs causing an area (gap) below the upper edge of the side window that was not covered. In this case, full coverage of the protective area by the cushion of the airbag device during expansion and deployment was difficult.

Note that the technology disclosed in Patent Document 1 is nothing more than simply the cushion covering the A pillar and no measures are taken to address the problem of tab length causing inability to sufficiently cover the protective area.

In light of this problem, an object of the present invention is to provide an airbag device enabling reliably covering an appropriate range with a cushion and increasing occupant protection performance while ensuring suitable deployment behavior at a position a tab is attached.

Means for Solving the Problem

In order to resolve the problem described above, a typical configuration for an airbag device according to the present invention comprises:

a cushion stowed rolled or folded at an upper part of a side surface inside a vehicle cabin that expands and deploys along the side surface, comprising:

an inflator inserted inside the cushion that supplies gas to the cushion; and a tab for suspending the cushion from an upper part of the side surface; wherein the cushion includes:

a duct having a tab at the upper part of the side surface extending in the front-to-back direction of the vehicle that expands and deploys with inflowing gas, a main chamber positioned below the duct, and a sub chamber provided at the upper part of the side surface;

the upper end of the sub chamber is positioned above the upper edge of a side window; and the lower end of the sub chamber is positioned below an upper end of the duct.

Therefore, the length of the tab for suspending the cushion from the upper part of the side surface inside the vehicle cabin needs to be set with consideration for ensuring suitable deployment behavior of the cushion and for the shape of the cushion in the stowed state. Thus, with this manner of airbag device, at the position the tab is attached, a certain length of tab needs to be ensured, and this may lead to cases where the cushion was not sufficiently lifted by the tabs causing an area (gap) below the upper edge of the side window that was not covered.

Here, at the position the tab is attached with the cushion of the configuration described above, in addition to the main chamber, the upper end of the sub chamber is positioned above the upper edge of the side window. Furthermore, the lower end of the sub chamber is attached to the tab or positioned lower than the upper end of an integral duct.

Thus, the sub chamber can cover between the upper end of the duct and the upper edge of the side window and can cover the gap below the upper edge of the side window. In addition, with the configuration described above, covering an appropriate range with a cushion and increasing occupant protection performance while ensuring suitable deployment behavior at a position a tab is attached is feasible.

The sub chamber described above expands and deploys more to the outside of the vehicle than the duct and the position is restricted by contact with the weather strip attached to the lower end of the roof side rail at the upper part of the side surface.

In this manner, the sub chamber expands and deploys more to the outside of the vehicle than the duct and the position of the sub chamber is restricted in the vertical direction of the vehicle by contact with the weather strip at the lower end of the roof side rail. Thus, the lower end of the expanded and deployed sub chamber can be positioned below the upper end of the duct and the upper end of the sub chamber can be positioned above the upper edge of the side window of the vehicle.

The sub chamber described above includes a leg part connected to the duct and a portion extending from the leg part in the front-to-back direction of the vehicle, and the tab may be attached to the duct at a location positioned somewhere on the portion extending in the front-to-back direction of the vehicle.

In this manner, the sub chamber includes a leg part and a portion extending therefrom in the front-to-back direction of the vehicle so the tab can be attached to a portion of the duct at a location positioned somewhere on the portion extending in the front-to-back direction of the vehicle. Thus, the cushion can be suspended in a suitable position by the tab.

The sub chamber is formed in a bridge shape with a pair of legs separated in the front-to-back direction and connected to the duct and a connecting part that connects the pair of legs, and the tab is attached in a portion of the duct positioned between the pair of legs.

In this manner, the sub chamber has a bridge shape so the tab can be attached at a location positioned between the pair of legs. Thus, the cushion can be suspended in a suitable position by the tab.

The connecting part of the sub chamber folds and bends to the outside of the vehicle during expansion and deployment and may be positioned between the pair of legs and the upper edge of the side window.

Thus, the sub chamber can reliably cover the gap below the upper edge of the side window based on the connecting part folded and bent toward the outside of the vehicle during expansion and deployment.

A retaining member that is wound on an outer surface of the cushion in a stowed state and that breaks during cushion deployment is connected to the portion of the duct described above.

In this manner, at the position the tab is attached, a retaining member (tape) can be wound on the cushion at the portion of the duct positioned between the pair of legs of the bridge shaped sub chamber. Therefore, the tape can be wound at an appropriate position of the cushion in a stowed state, enabling readily winding with the tape and maintaining the shape of the cushion.

The sub chamber described above may include a blocking part that blocks one of the pair of legs from the duct. Even if the blocking part is provided, gas flows in from the duct to the other leg part enabling the sub chamber to expand and deploy.

The region between the sub chamber described above and the portion extending in the front-to-back direction of the vehicle may be hollow or made up of a non-expanding region that does not expand.

In addition, the region between the sub chamber described above and connecting part may be hollow or made up of a non-expanding region that does not expand.

Effect of the Invention

With the present invention, an airbag device enabling reliably covering an appropriate range with a cushion and increasing occupant protection performance while ensuring suitable deployment behavior at a position a tab is attached can be provided.

DESCRIPTION OF THE PREFERRED EMBODIMENTS

Preferred embodiments according to the present invention will hereinafter be described in detail with reference to the attached drawings. Dimensions, materials, other specific numerical values, and the like indicated in the embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention.

Figure 1A:
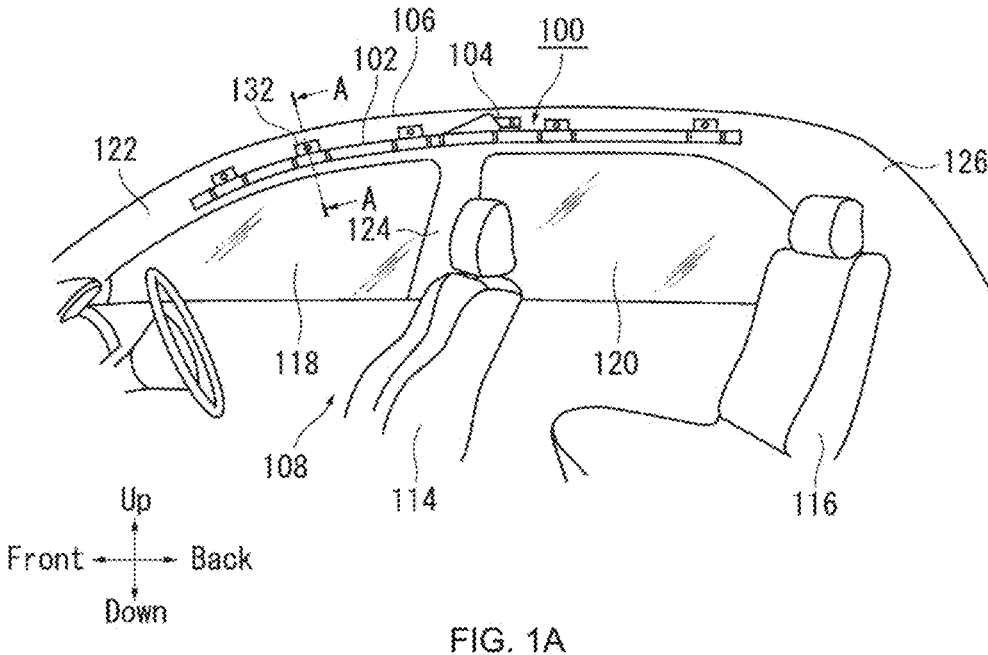
FIG. 1 is a schematic diagram depicting an airbag device of an embodiment of the present invention.

FIG. 1 is a schematic diagram depicting an airbag device 100 of an embodiment of the present invention. FIG. 2 is a cross section view along A-A of the airbag device 100 in FIG. 1(*a*). FIG. 1 (*a*) illustrates the non-deployed state (stowed) of a curtain airbag (cushion 102). In addition, the cushion 102 depicted in FIG. 1(*a*) is for the right side surface of the vehicle and while not depicted, a cushion for the left side surface has a similar symmetrical structure. FIG. 1(*b*) is a diagram depicting the expanded and deployed condition of the main part of the cushion 102 of FIG. 1(*a*).

Regarding the present Embodiment, when an occupant is seated in a seat in a regular posture, the direction the occupant faces is referred to as front, and the opposite direction is referred to as rear. Furthermore, when the occupant is seated in the seat in a regular posture, the right of the occupant is referred to as the right direction, and the left of the occupant is referred to as the left direction. Furthermore, when the occupant is seated in a regular posture, the direction towards the head of the occupant is referred to as up, and the direction towards the legs of the occupant is referred to as down. Furthermore, as needed, any diagrams used in descriptions below will indicate the front, rear, left, right, up, and down directions based on the occupant as described above as Front, Rear, Left, Right, Up, and Down.

As depicted in FIG. 1(*a*), the airbag device 100 is provided with an inflator 104 that is a gas generating device and the cushion 102 expands and deploys to restrain the occupant based on gas pressure supplied from the inflator 104. The cushion 102 is formed into a bag shape, for example, by sewing the base fabric constituting the cushion surface on the front and back sides or by weaving the fabric using OPW (One-Piece Woven).

The cushion 102 is mounted to a roof side rail 106 depicted in the drawing in a rolled state as indicated in FIG. 1(*a*). The roof side rail 106 is positioned on an upper side of the interior of the vehicle 108 and forms the vehicle body side wall. As indicated in FIG. 2, the rolled cushion 102 is stowed in a stow space 110. The stow space 110 is formed, for example, by assembling a garnish 112 such as a roof headlining to the roof side rail 106. Note that the garnish 112 is omitted from depiction in FIG. 1(*a*).

The vehicle 108 depicted in FIG. 1(*a*) is a vehicle with two rows arranged as a front seat 114 and a back seat 116 from the front of the vehicle. Starting at the front of the vehicle, side windows 118 and 120 are installed on a side surface of the vehicle 108. Pillars supporting the roof are provided in the vehicle front-to-back direction for each of the side windows 118 and 120. Starting at the front of the vehicle 108, these pillars are referred to as a front pillar 122, a center pillar 124, and a rear pillar 126.

For the airbag device 100, in an emergency such as a side collision, gas is supplied to expand the cushion 102, and thereby the cushion 102 pushes the garnish 112 toward the inside of the vehicle and an end part 112*a* of the garnish 112 in contact with the roof side rail 106 depicted in FIG. 2 is lowered. Therefore, the cushion 102 appears from a gap between the garnish 112 and a lower end 106*a* of the roof side rail 106 and expands and deploys along a side surface of the vehicle cabin. In addition, a weather strip 128 is attached to the lower end 106*a* of the roof side rail 106.

The airbag device 100 is provided with a tab 130 as depicted in FIG. 2. The tab 130 is a plurality of strip shaped members on the cushion 102 at prescribed intervals that suspend the cushion 102 from an upper part of the side surface inside the vehicle cabin. In addition, the tab 130 is mounted to a bracket 132 secured to the vehicle, in other words the roof side rail 106.

The bracket 132 is, for example, made of metal and has a bolt hole 134 and an insertion hole 136, through which the tab 130 is inserted and folded back. The bracket 132 is secured to the roof side rail 106 by screwing a bolt 138 passed through the bolt hole 134 and a nut 140, as depicted in FIG. 2. The tabs 130 are sewn and attached as indicated by a sewing line 142 in a folded and overlapped state at the insertion hole 136 of the bracket 132.

The cushion 102 has a duct 144, main chamber 146, and sub chamber 148 at the position where the tab 130 is attached, and these areas are expansion regions that expand due to gas from the inflator 104 flowing thereinto, as indicated by the arrow B in FIG. 1(*b*). Note that in FIG. 1(*b*), the tab 130 and bracket 132 depicted in FIG. 2 are omitted.

The duct 144 extends in the front-to-back direction of the vehicle and as indicated by a sewing line 150 in FIG. 2, the tab 130 is sewn and attached to the duct 144 (cushion 102). Note that the tab 130 does not necessarily need to be attached to the cushion 102 by sewing and may be attached by other means or integrated with the cushion 102.

The main chamber 146 is demarcated by a seam part 152 depicted in FIG. 1(*b*) and is positioned lower than the duct 144. Note that the duct 144 and the main chamber 146 that constitute the cushion 102 do not necessarily need to be compartmentalized. In the case of non-compartmentalization (no duct 144), of course the tab 130 can be attached or integrated directly with the main chamber. In addition, the seam part 152 is formed by joining the cloth of the front and back of the cushion 102 together.

In addition, as indicated in FIG. 2, a retaining member (tape 154) is wound around an outer surface 102*a* of the cushion 102 in a stowed state. The tape 154 is wound around the outer surface 102*a* of the cushion 102. In addition, the tape 154 is a fragile member that breaks due to pressure caused by expansion and deployment of the cushion 102, and so does not hinder deployment of the cushion 102. Tape 154 may be fabric or non-woven fabric.

The sub chamber 148 is provided on the side surface inside the vehicle cabin and is integrated with the cushion 102 together with the main chamber 146.

Here, the length of the tab 130 is set with consideration for the shape of the cushion 102 in a stowed state and the deployment behavior of the cushion 102. The tab 130 being too short will affect the deployment behavior of the cushion 102 such as causing a change in the deployment direction of the cushion 102. Therefore, the length of the tab 130 needs to be set with consideration for ensuring suitable deployment behavior of the cushion 102 and for the shape of the cushion 102 in the stowed state.

Figure 3A:
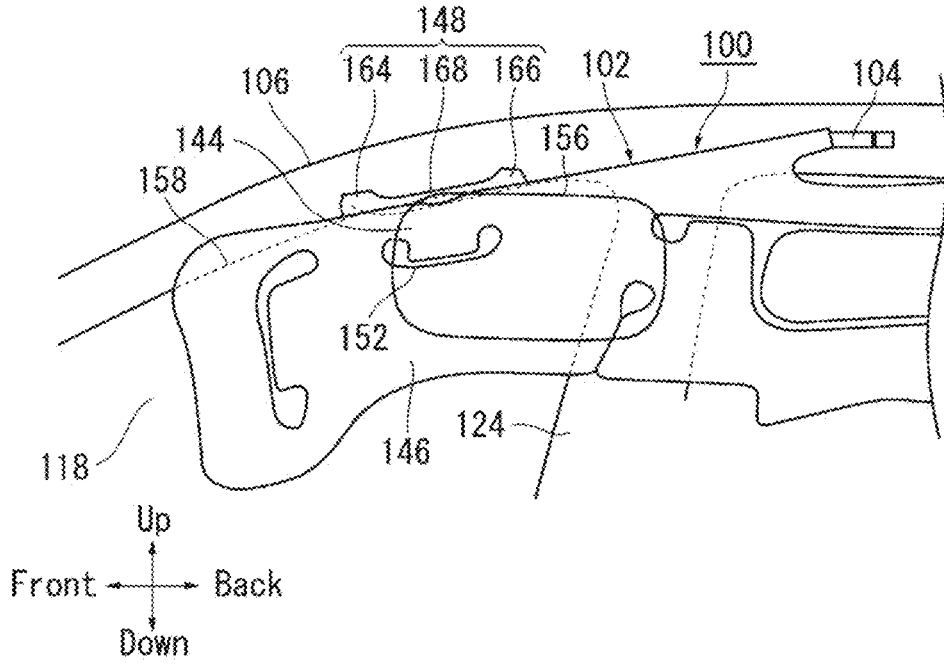
FIG. 3 is a diagram depicting a state of a cushion of the airbag device of FIG. 1(*a*) expanded and deployed.

FIG. 3 is a diagram depicting a state of a cushion 102 of the airbag device 100 of FIG. 1(*a*) expanded and deployed. Note that the cushion 102 of FIG. 1(*b*) depicts an expanded and deployed state without restrictions on the sub chamber 148 position. On the other hand, the cushion 102 of the FIG. 3(*a*) depicts a state of the sub chamber 148 position being restricted due to contact with the roof side rail 106 or the like. FIG. 3(*b*) is a view depicting a portion of FIG. 3(*a*) in an enlarged manner.

In conjunction with the recent New Car Assessment Programs (NCAP), the region that the cushion 102 should cover when expanded and deployed, in other words, the protective area 156 (see FIG. 3(*a*)), has been defined. On the other hand, with the airbag device 100, at the position the tab 130 is attached, a certain length of the tab 130 needs to be ensured with consideration for the deployment behavior of the cushion 102, as described above.

Therefore, as indicated in FIG. 3(*b*), with the airbag device 100, there were cases when the cushion 102 was not sufficiently lifted by the tab 130 causing a gap 162 indicated by hatching in the drawing to occur between an upper edge 158 of a side window 118 and an upper end 160 of the duct 144, which hangs down positioned below this upper edge 158.

Here, with the airbag device 100, a configuration enabling covering the gap 162 depicted in FIG. 3(*b*) using the sub chamber 148 was adopted. In other words, the sub chamber 148 has a pair of legs 164 and 166 and connecting part 168, and is formed in a bridge shape as depicted in FIG. 1(*b*). The pair of legs 164 and 166 are separated in the front-to-back direction of the vehicle and are connected to the duct 144. The connecting part 168 connects the pair of legs 164 and 166 and is separated from the duct 144.

In this manner, the sub chamber 148 has a bridge shape so the tab 130 depicted in FIG. 2 can be attached to a portion 170 (see FIG. 1(*b*)) of the duct 144 positioned between the pair of legs 164 and 166. Thus, with the airbag device 100, the cushion 102 can be suspended in a suitable position by the tab 130.

Note that the region 171 between the connecting part 168 of the sub chamber 148 and the duct 144 is hollow in the present Embodiment. However, the region 171 may be a non-expanding region that does not expand such as fabric.

Figure 3B:
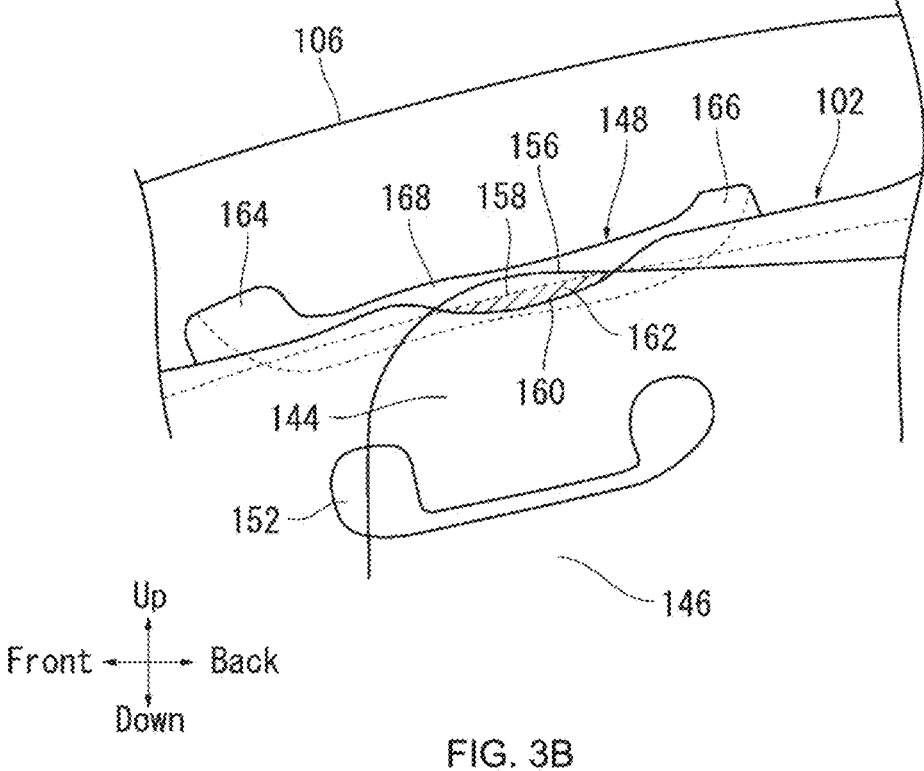

Furthermore, by the connecting part 168 being folded and bent to the outside during expansion and deployment, the bridge shaped sub chamber 148 covers the gap 162 between the upper edge 158 of the side window 118 and the upper end 160 of the duct 144, as depicted in FIG. 3(b). Hereinafter, deployment behavior of the cushion 102 will be described.

Figure 4:
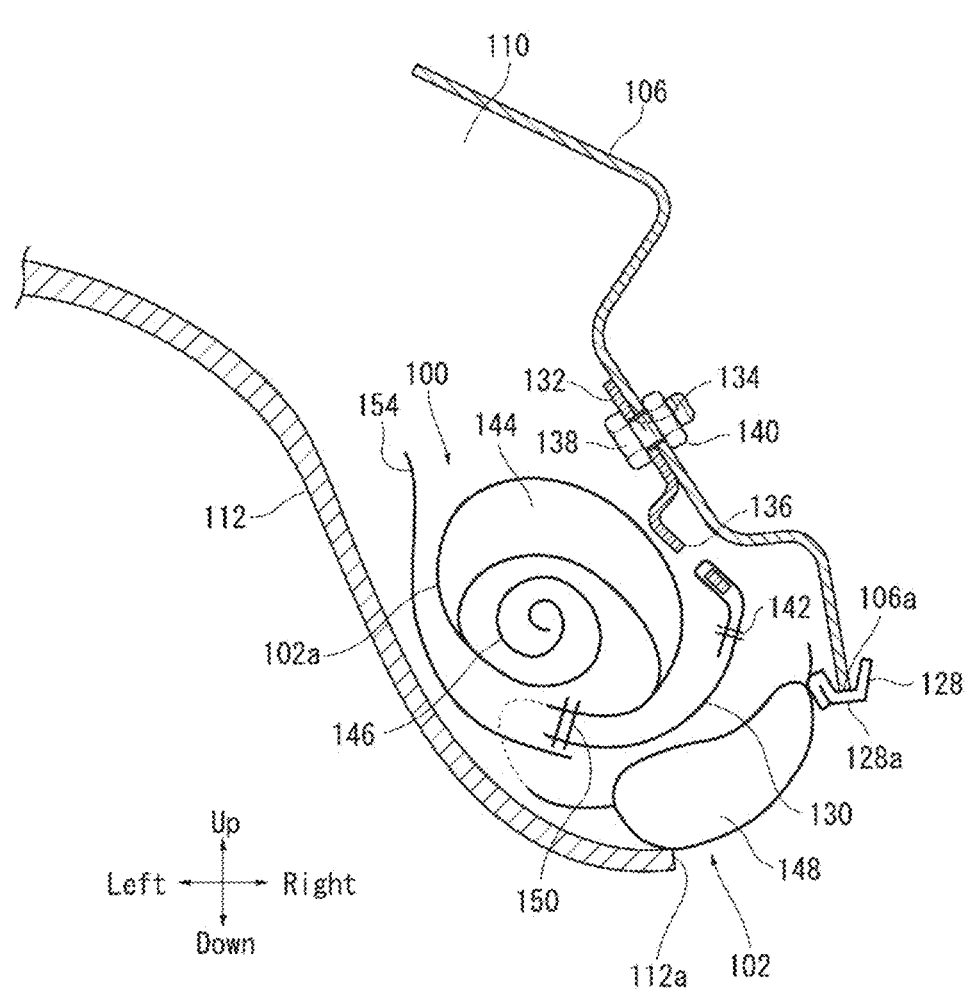
FIG. 4 is a diagram depicting a state of the cushion of the airbag device of FIG. 2 partially deployed.

FIG. 4 is a diagram depicting a state of the cushion 102 of the airbag device 100 of FIG. 2 partially deployed. When gas from the inflator 104 is supplied during an emergency, the sub chamber 148 of the cushion 102 expands and presses on the garnish 112 causing the end part 112a of the garnish 112 to lower. Here, the sub chamber 148 comes into contact with the weather strip 128 attached to the lower end 106a of the roof side rail 106. In addition, a lower end 128a of the weather strip 128 is positioned at roughly the same height as the upper edge 158 of the side window 118 depicted in FIG. 3(b).

Furthermore, with the cushion 102, the duct 144 starts to expand while the main chamber 146 has not yet expanded. Note that tape 154 wound on the outer surface 102a of the cushion 102 is broken by pressure associated with expansion and deployment of the cushion 102, as depicted.

Figure 5:
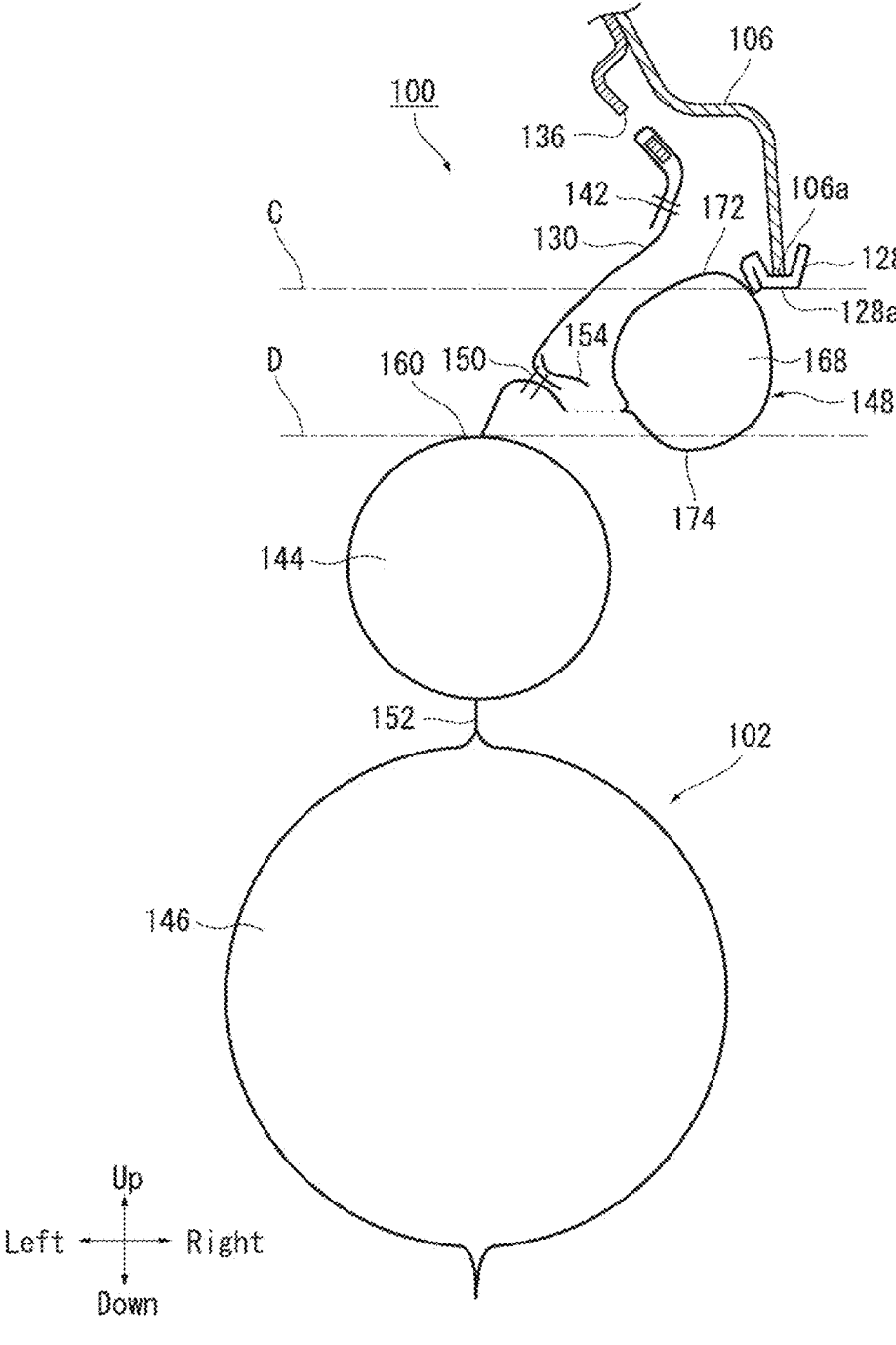
FIG. 5 is a diagram depicting a state continuing from FIG. 4 with the cushion expanded and deployed.

FIG. 5 is a diagram depicting a state continuing from FIG. 4 with the cushion 102 expanded and deployed. Note that the state during expansion and deployment of the cushion 102 of FIG. 5 corresponds to the state of the cushion 102 in FIG. 3(b).

For the sub chamber 148 of the cushion 102, the connecting part 168 expands and deploys to the outside of the vehicle from the duct 144, as depicted, and the position in contact with the weather strip 128 attached to the lower end 106a of the roof side rail 106 is restricted.

As a result, an upper end 172 of the connecting part 168 of the sub chamber 148 is positioned at the height of the upper edge 158 of the side window 118 indicated by a dotted line C in the diagram, in other words, above the height of the lower end 128a of the weather strip 128. In addition, a lower end 174 of the connecting part 168 of the sub chamber 148 is positioned below the height of the upper end 160 of the duct 144 indicated by dotted line D in the diagram. In addition, the height difference between dotted lines C and D corresponds to the height of the gap 162 depicted in FIG. 3(b).

In this manner, the connecting part 168 is folded and bent to the outside of the vehicle during expansion and deployment and is positioned between the pair of legs 164 and 166 and the upper edge 158 of the side window 118. Furthermore, the length of the connecting part 168 of the sub chamber 148 in the vehicle front-to-back direction is longer than the length of the gap 162 in the vehicle front-to-back direction, as depicted in FIG. 3(b).

Thus, the sub chamber 148 can cover the gap 162 between the upper end 160 of the duct 144 and the upper edge 158 of the side window 118. Therefore, with the airbag device 100, at the position the tab 130 is mounted, appropriate deployment behavior of the cushion 102 can be ensured, the protective area 156 can be reliably covered by the cushion 102, enabling improvement of the protection performance of the occupant (see FIG. 3(a)).

Figure 1B:
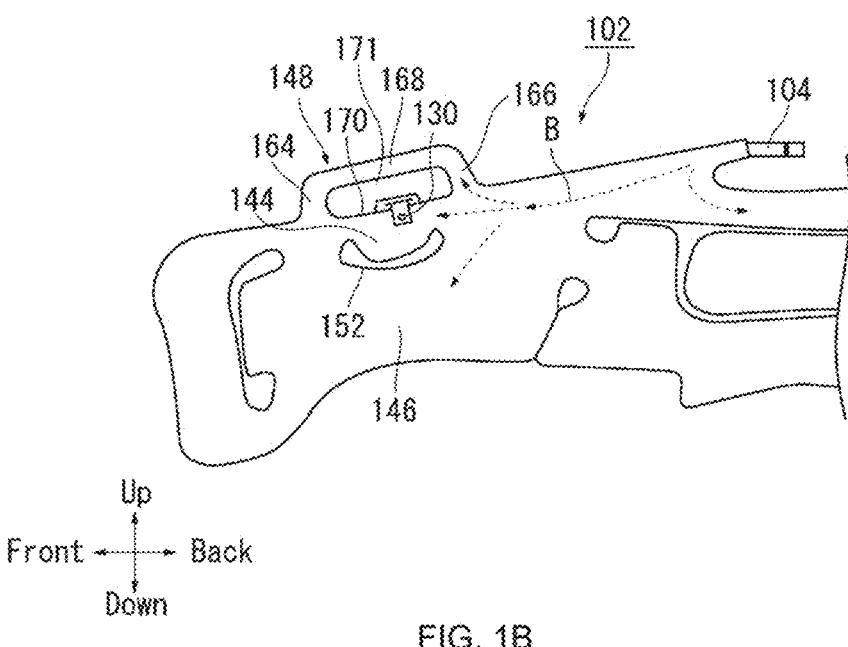
Figure 2:
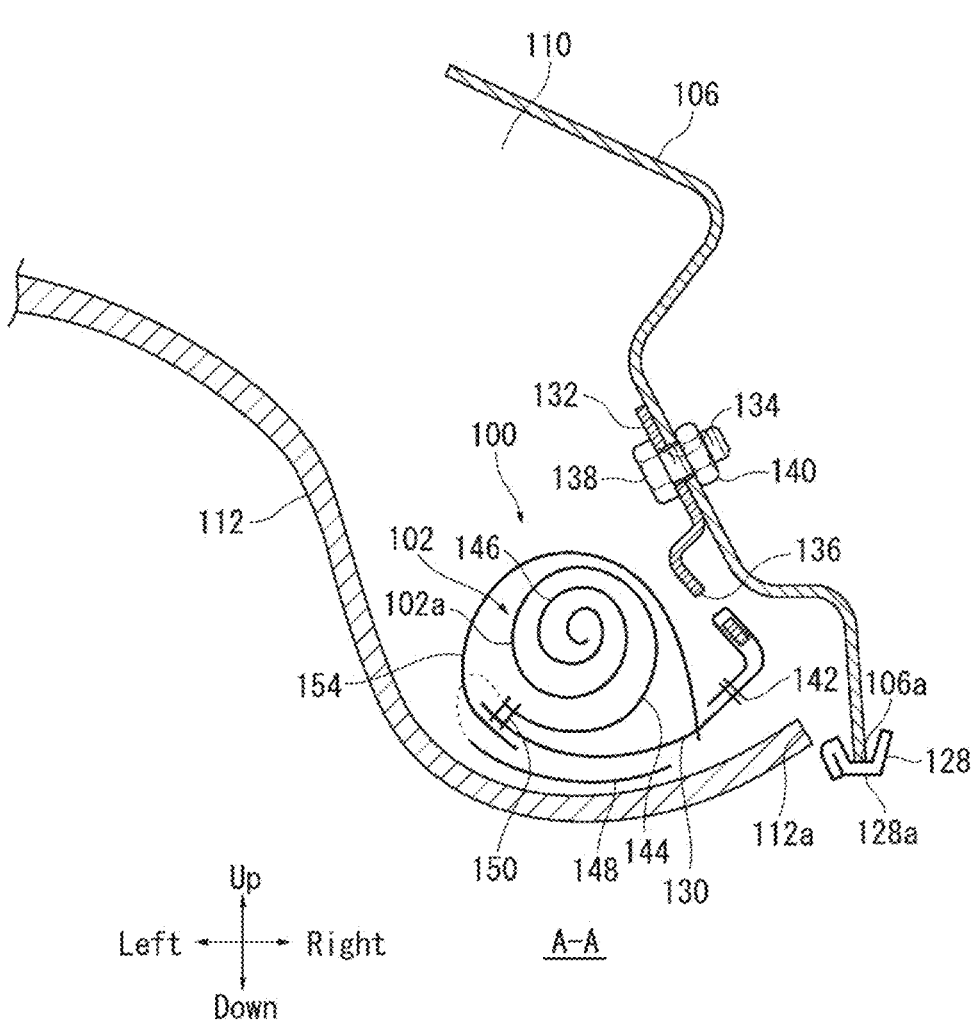
FIG. 2 is a cross section view along A-A of the airbag device in FIG. 1(*a*).

In addition, at the position the tab 130 is attached, tape 154 can be wound on the cushion 102 at the portion 170 (see FIG. 1(b)) of the duct 144 positioned between the pair of legs 164 and 166 of the bridge shaped sub chamber 148. Therefore, the tape 154 can be wound at an appropriate position of the cushion 102 in a stowed state, enabling readily winding with the tape 154 and maintaining the shape of the cushion 102.

Figure 6A:
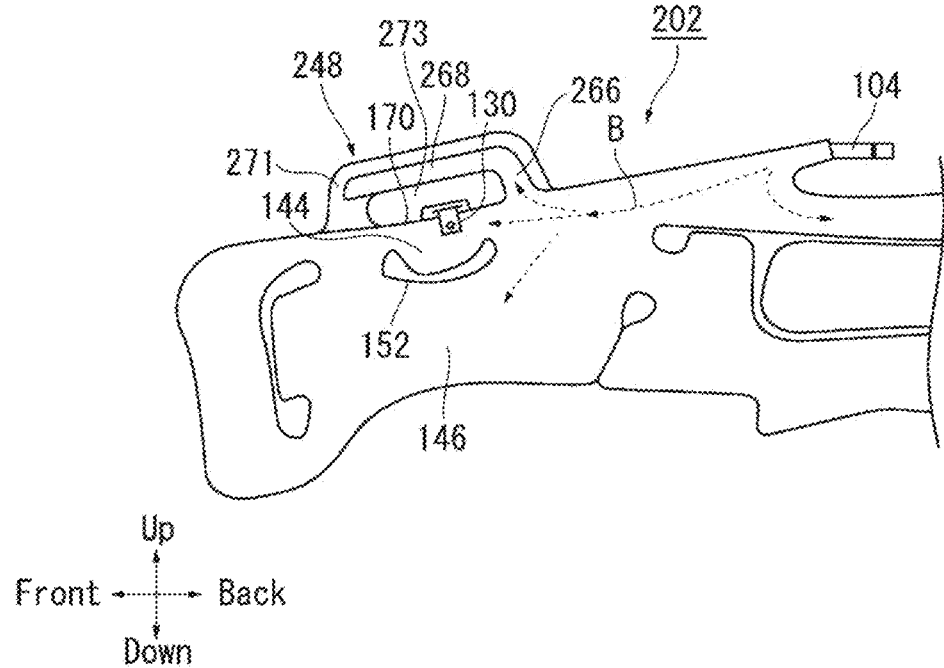
FIG. 6 is a diagram depicting a modified example of the cushion depicted in FIG. 1(*b*).

FIG. 6 is a diagram depicting a modified example of the cushion depicted in FIG. 1(b). In FIG. 6, similar elements within FIG. 1(b) are indicated using the same codes, and a description thereof is omitted. A sub chamber 248 of a cushion 202 of FIG. 6(a) is different from the sub chamber 148 of FIG. 1(b).

In other words, the sub chamber 248 includes a leg part 266 connected to the duct 144 and a portion 268 extending in the front-to-back direction of the vehicle from the leg part 266. Furthermore, the tab 130 is attached to a portion of the duct 144.

In this manner, a feature of the sub chamber 248 is including a single leg part 266. The sub chamber 248 is attached to the duct 144 by a non-expanding part 271, for example, fabric or the like without space inside for expanding, wound on the leg part 266 and on the outside of the portion 268.

In this manner, the sub chamber 248 includes a leg part 266 and a portion 268 extending therefrom in the front-to-back direction of the vehicle so the tab 130 can be attached to a portion of the duct 144 at a location positioned somewhere on the portion 268 extending in the front-to-back direction of the vehicle. Thus, with this configuration as well, the cushion 202 can be suspended in a suitable position by the tab 130.

Note that with the present Embodiment, a region 273 between the portion 268 of the sub chamber 248 extending in the front-to-back direction of the vehicle and the duct 144 is hollow. However, the region 273 may also be a non-expanding region such as fabric that does not expand.

Figure 6B:
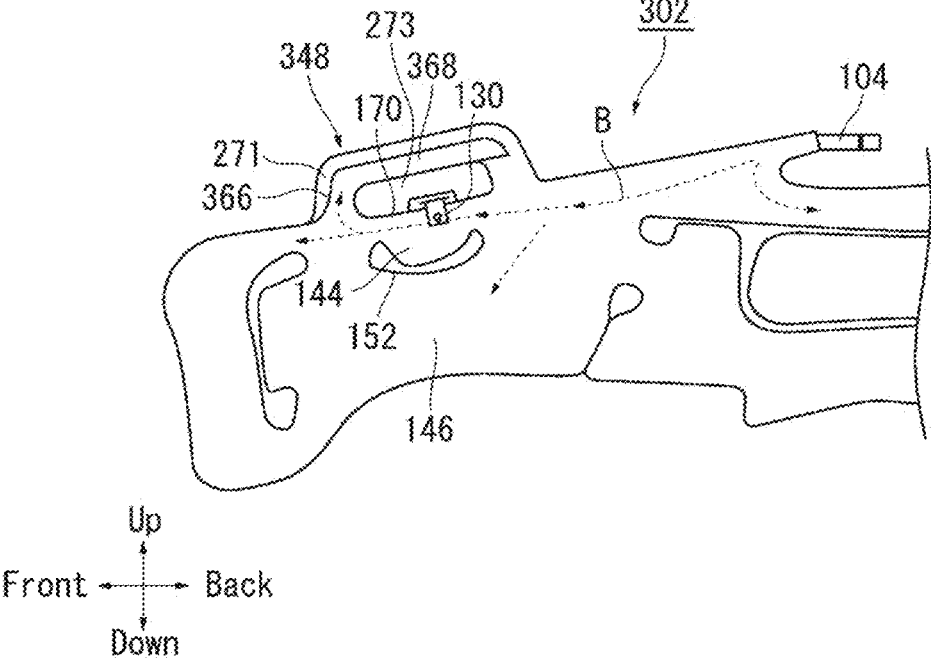

A sub chamber 348 of a cushion 302 of FIG. 6(b) has a shape symmetrical with the sub chamber 248 of FIG. 6(a). In other words, the sub chamber 348 has a single leg part 366 connected to the duct 144 on the vehicle front side and further, has a portion 368 extending from this leg part 366 in the front-to-back direction of the vehicle. Therefore, gas from the duct 144 enters the leg part 366 to the vehicle front side and then enters the portion 368 extending in the front-to-back direction of the vehicle and causes the sub chamber 348 to expand.

Figure 7A:
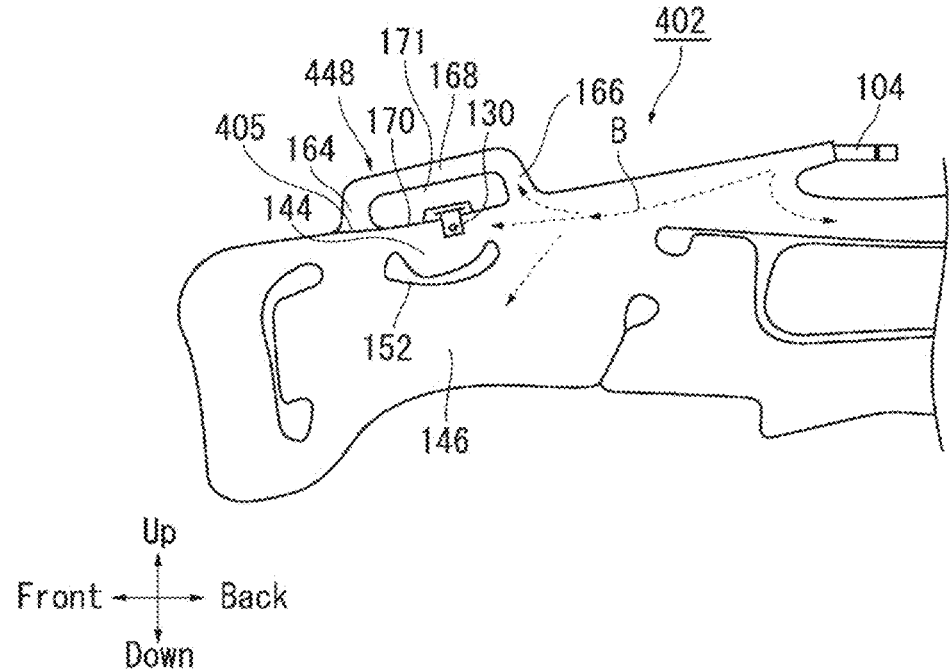
FIG. 7 is a diagram depicting a modified example of the cushion depicted in FIG. 1(*b*).

FIG. 7 is a diagram depicting a modified example of the cushion depicted in FIG. 1(b). In FIG. 7, similar elements within FIG. 1(b) are indicated using the same codes and a description thereof is omitted. A sub chamber 448 of a cushion 402 of FIG. 7(a) is different from the sub chamber 148 of FIG. 1(b).

In other words, of the pair of legs 164 and 166, the sub chamber 448 includes a blocking part 405 that blocks the leg part 164 to the front of the vehicle from the duct 144.

Figure 7B:
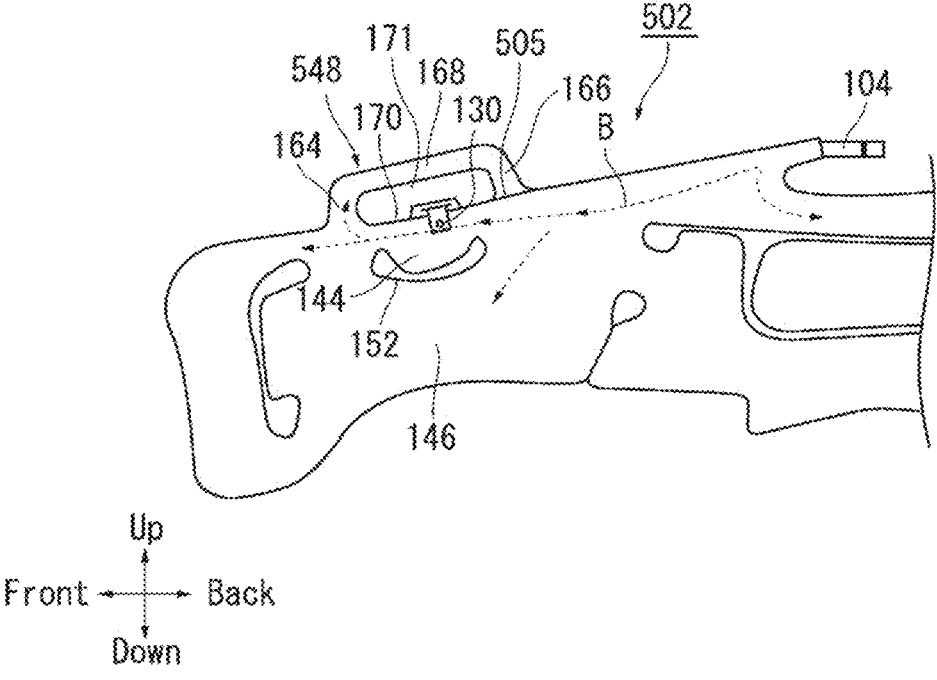

A sub chamber 548 of a cushion 502 of FIG. 7(b) has a shape symmetrical with the sub chamber 448 of FIG. 7(a). In other words, the sub chamber 548 has a blocking part 505 that blocks the leg part 166 to the back of the vehicle from the duct 144.

The blocking parts 405 and 505 can be formed by sewing, for example. As indicated by FIGS. 7(a) and (b), even if blocking part 405 or 505 is provided, the other leg part 166 or 164 to which the blocking part is not provided will have gas enter therein from the duct 144, enabling the sub chamber 448 or 548 to expand and deploy.

Figure 8:
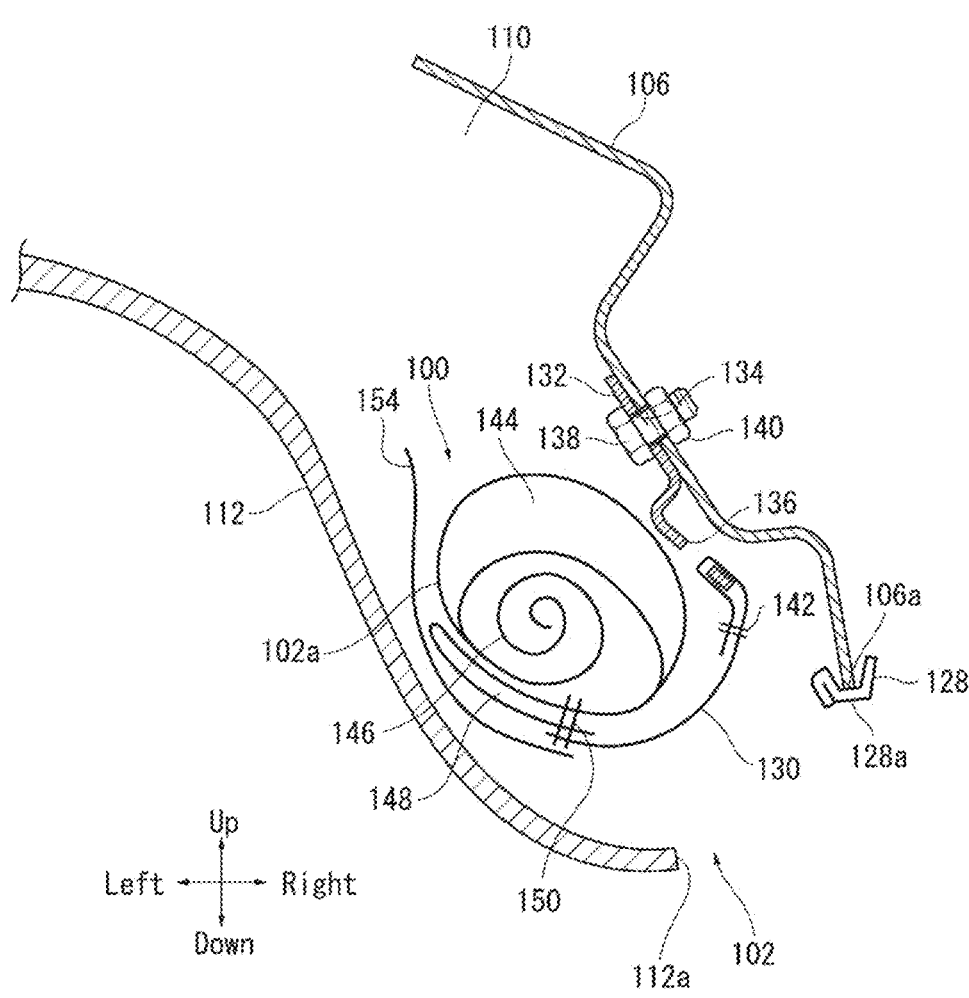
FIG. 8 is a diagram depicting a modified example of how the cushion depicted in FIG. 4 is stowed.

FIG. 8 is a diagram depicting a modified example of how the cushion depicted in FIG. 4 is stowed. In FIG. 8, similar elements within FIG. 4 are indicated using the same codes and a description thereof is omitted. As indicated in FIG. 8, in this modified example, the sub chamber 148 is sewn together with the tab 130 by the sewing line 150 at a location continuous with the duct 144 and a looped location.

Figure 9:
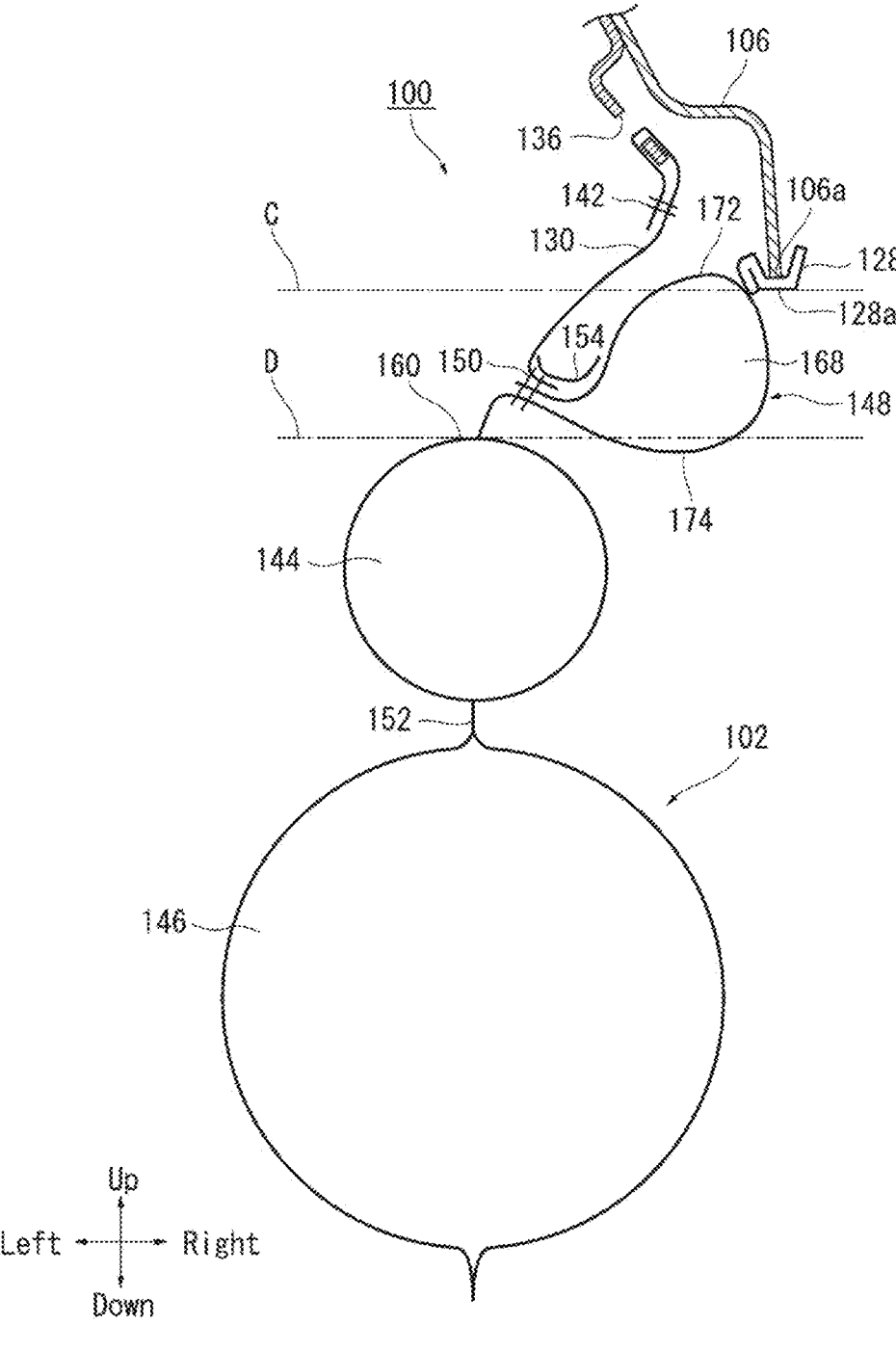
FIG. 9 is a diagram depicting a state continuing from FIG. 8 with the cushion expanded and deployed.

FIG. 9 is a diagram depicting a state continuing from FIG. 8 with the cushion 102 expanded and deployed. For the sub chamber 148 of the cushion 102, the connecting part 168 expands and deploys to the outside of the vehicle from the duct 144, as depicted, and the position in contact with the weather strip 128 attached to the lower end 106*a* of the roof side rail 106 is restricted. In other words, even in the case of the method for stowing the cushion 102 of FIG. 8 is used, the same effect as that described for FIG. 5 can be obtained.

Preferred Embodiments of the present invention were described with reference to the appended drawings, but it goes without saying that the present invention is not limited to such examples. It is clear that a person of ordinary skill in the art could conceive of various modifications or revisions within the scope set forth by the claims, and it would be understood that these modifications or revisions would belong to the technical scope of the present invention.

Moreover, the example in which the airbag device according to the present invention is applied to an automobile has been described in the embodiments described above. However, in addition to automobiles, the present invention can be applied to aircrafts, ships, and the like, with the same operation and effects capable of being achieved.

INDUSTRIAL APPLICABILITY

The present invention can be used as an airbag device provided with a curtain airbag that expands and deploys along a side surface inside a vehicle for the purpose of protecting the occupant during a side collision or rollover of the vehicle.

EXPLANATION OF REFERENCE SIGNS

100. Airbag device, 102, 202, 302, 402, 502. Cushion, 102*a*. Outer surface of cushion, 104. Inflator, 106. Roof side rail, 106*a*. Lower end of roof side rail, 108. Vehicle, 110. Stow space, 112. Garnish, 112*a*. Lower end of garnish, 114. Front seat, 116. Back seat, 118, 120. Side window, 122. Front pillar, 124. Center pillar, 126. Rear pillar, 128. Weather strip, 128*a*. Lower end of weather strip, 130. Tab, 132. Bracket, 134. Bolt hole, 136. Insertion hole, 138. Bolt, 140. Nut, 142, 150. Sewing line, 144. Duct, 146. Main chamber, 148, 248, 348, 448, 548. Sub chamber, 152. Seam part, 154. Tape, 156. Protective area, 158. Upper edge of side window, 160. Upper end of duct, 162. Gap, 164, 166, 266, 366. Leg part, 168. Connecting part, 170. Portion of duct, 171, 273. Sub chamber region, 172. Upper end of sub chamber connecting part, 174. Lower end of sub chamber connecting part, 268, 368. Portion extending in the front-to-back direction of the sub chamber, 271. Non-expanding part, 405, 505. Blocking part.

The invention claimed is:

1. An airbag device having a cushion stowed, rolled or folded at an upper part of a side surface inside a vehicle cabin configured to expand and deploy along the side surface, the airbag device comprising:

an inflator inserted inside the cushion that supplies gas to the cushion;

wherein the cushion including:

a duct having a tab at the upper part of the side surface for suspending the cushion from the upper part of the side surface, the duct extending in a front-to-back direction of a vehicle and adapted to expand and deploy with inflowing gas, a main chamber positioned below the duct, and a sub chamber provided at the upper part of the side surface;

an upper end of the sub chamber positioned above an upper edge of a side window; and a lower end of the sub chamber positioned below an upper end of the duct; and wherein the sub chamber is formed in a bridge shape with a pair of legs separated in the front-to-back direction and connected to the duct and a connecting part that connects the pair of legs and the tab is attached in a portion of the duct positioned between the pair of legs; and wherein the sub chamber further includes a blocking part for blocking one of the pair of legs from the duct.

2. The airbag device according to claim 1, wherein the sub chamber is configured to expand and deploy more to an outside of the vehicle than the duct, and comes into contact with a weather strip attached to a lower end of a roof side rail on the upper part of the side surface upon inflation of the cushion, restricting a position of the duct.

3. The airbag device according to claim 1, wherein the sub chamber includes the pair of legs connected to the duct and a portion extending from each of the pair of legs in the front-to-back direction of the vehicle.

4. The airbag device according to claim 3, wherein a retaining member is wound on an outer surface of the cushion in a stowed state, the retaining member connected to the portion of the duct and adapted to break during cushion deployment.

5. The airbag device according to claim 3, wherein a region of the sub chamber between the portion extending in the front-to-back direction of the vehicle and the duct is hollow or made up of a non-expanding region that does not expand.

6. The airbag device according to claim 1, wherein the connecting part of the sub chamber folds and bends toward an outside of the vehicle during expansion and deployment of the cushion and is positioned between the pair of legs and an upper edge of the side window.

7. The airbag device according to claim 1, wherein a retaining member that is wound on an outer surface of the cushion in a stowed state and that breaks during cushion deployment is connected to the portion of the duct.

8. The airbag device according to claim 1, wherein a region of the sub chamber between the connecting part and the duct is hollow or made up of a non-expanding region that does not expand.

9. An airbag device having a cushion stowed, rolled or folded at an upper part of a side surface inside a vehicle cabin configured to expand and deploy along the side surface, the airbag device comprising:

an inflator inserted inside the cushion that supplies gas to the cushion;

wherein the cushion includes:

a duct having a tab at the upper part of the side surface for suspending the cushion from the upper part of the side surface, the duct extending in a front-to-back direction of a vehicle and adapted to expand and deploy with inflowing gas, a main chamber positioned below the duct, and a sub chamber provided at the upper part of the side surface;

an upper end of the sub chamber positioned above an upper edge of a side window; and a lower end of the sub chamber positioned below an upper end of the duct;

wherein the sub chamber includes a pair of separate legs spaced from one another and connected to the duct separated in the front-to-back direction of the vehicle;

wherein the sub chamber forms a bridge shape having a connecting part connecting the pair of separate legs; and wherein the tab is attached to a portion of the duct positioned between the pair of separate legs on the duct.

10. The airbag device according to claim 9, wherein the sub chamber is configured to expand and deploy more to an outside of the vehicle than the duct, and come into contact with a weather strip attached to a lower end of a roof side rail on the upper part of the side surface upon inflation of the cushion, restricting a position of the duct.

11. The airbag device according to claim 9, wherein the connecting part of the sub chamber folds and bends toward an outside of the vehicle during expansion and deployment of the cushion and is positioned between the pair of legs and the upper edge of the side window.

12. The airbag device according to claim 9, wherein a retaining member is wound on an outer surface of the cushion in a stowed state, the retaining member connected to the portion of the duct and adapted to break during cushion deployment.

13. The airbag device according to claim 9, wherein the sub chamber further includes a blocking part for blocking one of the pair of legs from the duct.

14. The airbag device according to claim 9, wherein a region of the sub chamber between the portion extending in the front-to-back direction of the vehicle and the duct is hollow or made up of a non-expanding region that does not expand.

15. The airbag device according to claim 9, wherein a region of the sub chamber between the connecting part and the duct is hollow or made up of a non-expanding region that does not expand.

\* \* \* \* \*